US007089080B1

(12) United States Patent
Lysaght

(10) Patent No.: US 7,089,080 B1
(45) Date of Patent: Aug. 8, 2006

(54) PULSE TOOL CONTROLLER

(75) Inventor: Richard Lysaght, Hicksville, OH (US)

(73) Assignee: C.E. Electronics, Bryan, OH (US)

( * ) Notice: Subject to any disclaimer, the term of this patent is extended or adjusted under 35 U.S.C. 154(b) by 0 days.

(21) Appl. No.: 11/196,235

(22) Filed: Aug. 2, 2005

(51) Int. Cl.
*G06F 19/00* (2006.01)

(52) U.S. Cl. .......................... 700/160; 702/41; 702/45; 173/176

(58) Field of Classification Search ................ 700/160, 700/174, 275; 173/176, 181; 702/98, 41, 702/43–46
See application file for complete search history.

(56) References Cited

U.S. PATENT DOCUMENTS

| | | | | |
|---|---|---|---|---|
| 5,689,434 | A * | 11/1997 | Tambini et al. | 700/282 |
| 5,903,462 | A * | 5/1999 | Wagner et al. | 700/168 |
| 5,937,370 | A | 8/1999 | Lysaght | |
| 6,055,484 | A | 4/2000 | Lysaght | |
| 6,134,973 | A * | 10/2000 | Schoeps | 73/862.23 |
| 6,349,266 | B1 | 2/2002 | Lysaght et al. | |
| 6,430,463 | B1 | 8/2002 | Lysaght | |
| 6,450,299 | B1 | 9/2002 | Lysaght | |
| 6,567,754 | B1 | 5/2003 | Lysaght | |
| 6,655,471 | B1 * | 12/2003 | Cripe et al. | 173/176 |
| 6,668,212 | B1 * | 12/2003 | Colangelo et al. | 700/275 |
| 6,810,335 | B1 | 10/2004 | Lysaght | |
| 6,871,153 | B1 | 3/2005 | Lysaght | |
| 2004/0045729 | A1 * | 3/2004 | Lehnert et al. | 173/1 |

OTHER PUBLICATIONS

Fujinaka et al—"Bolt Tightening Control Using Neural Networks". 2001 IEEE International Conference on Systems, Man, and Cybernetics. Oct. 7-10, 2001.*

* cited by examiner

*Primary Examiner*—Leo Picard
*Assistant Examiner*—Alexander Kosowski
(74) *Attorney, Agent, or Firm*—Emch, Schaffer, Schaub & Porcello Co., L.P.A.

(57) ABSTRACT

This is a system for monitoring and controlling a compressed air driven, pulse tool. The system includes a means for measuring air pressure supplied to a pneumatic pulse tool and converting the air pressure into an electrical signal representative of the air pressure; a programmed microprocessor configured to identify a portion of the signal representative of the air pressure; and a means for controlling the flow of air to the tool. The programmed microprocessor is configured to identify and store timers to be associated with the signal representing the air pressure. The microprocessor is configured to report an acceptable condition if all of the timers are satisfied and the air flow to the tool has been shut-off by the microprocessor. The system is external to the tool.

13 Claims, 3 Drawing Sheets

PULSE TOOL CONTROLLER

TECHNICAL FIELD

This invention relates to a system for controlling and monitoring a compressed air driven, pulse tool. More specifically, the system is configured to shut off the air flow to the tool.

BACKGROUND OF THE INVENTION

U.S. Pat. Nos. 6,055,484 and 5,937,370 represent a recent, significant development in the field of tool monitoring and assembly qualifying. The programmed microprocessor is configured to identify a portion of the signal representative of the analog signal corresponding to a completed cycle. The configuration also allows for identification of an incomplete cycle and a multiple counting of a completed cycle (double-hit). The qualifiers and disclosures of U.S. Pat. Nos. 6,055,484 and 5,937,370 are herein incorporated by reference.

U.S. Pat. No. 6,810,335 represents the next generation qualifier uses multiple thresholds to perform its operations. This assembly qualifier is a counting apparatus that monitors either the pressure of a pneumatic tool to determine if the tool's clutch has shut the tool off. This version makes use of up to four thresholds and five timers in order to accomplish its qualification of an assembly process. Certain pneumatic pulse tools have an internal mechanical device that regulates (governs) the incoming air supply. Because of this, the pneumatic signature can "fool" the qualifier by creating a signal that would satisfy all of the timers and thresholds even thought the tool was in reverse or running in the air and not tightening a fastener at all.

With these particular pneumatic tools the difference between a "good" run-down and the other anomalies were the pulses. Even though the other qualification methods were used to insured that the pressure was in a window where it was considered to be pulsing, that logic was not sufficient to identify individual pulses. In U.S. Pat. No. 6,810,335 the invention is a pulse counting algorithm that knows how to identify individual pulses. A count of all the positive pulses is kept during a rundown and this pulse count is compared to the desired number of pulses at the end of the run. At the end of the run, if all criteria are met including timers, thresholds, and number of pulses, then the fastening is considered good. The qualifiers and disclosures of U.S. Pat. No. 6,810,335 is herein incorporated by reference.

In the pneumatic, pulse tools of these recent developments, the tool included an internal means of shutting off the tool. A need exits, however, for a system for monitoring and controlling a compressed air driven, pulse tool that does not have an internal mechanism for stopping the tool.

BRIEF SUMMARY OF THE INVENTION

This invention is a system that is configured to shut off the air supply to the tool. The system is designed for use with a pulse tool with or without an internal clutch. This system for monitoring and controlling a compressed air driven, pulse tool includes a means for measuring air pressure of a pneumatic pulse tool and converting the air pressure into an electrical signal representative of the air pressure; a means for electrically computationally processing the electrical signal into another signal representative at least one parameter corresponding to a condition of the tool being monitored which is a function of air pressure; a programmed microprocessor configured to identify a portion of the signal representative of the air pressure corresponding to the parameter; and a means for controlling the flow of air to the tools.

The programmed microprocessor is configured to identify and store the parameter of a first threshold air pressure to begin monitoring the parameter of a cycle and configured to identify and store the parameter of a second air pressure to identify a portion of the signal representative of the air pressure of the tool driving a fastener. The microprocessor also is configured to indicate a pulsing region based on the parameter of the second air pressure; and configured to identify and store a portion of the air pressure as a calibration value for the parameter of the second air pressure. Next the programmed microprocessor is configured to identify and store timers associated with the parameters and configured to report an acceptable condition if all of the timers are satisfied and the air flow to the tool has been shut-off by the microprocessor. The control is an external device that regulates the incoming air supply.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Figure 1:
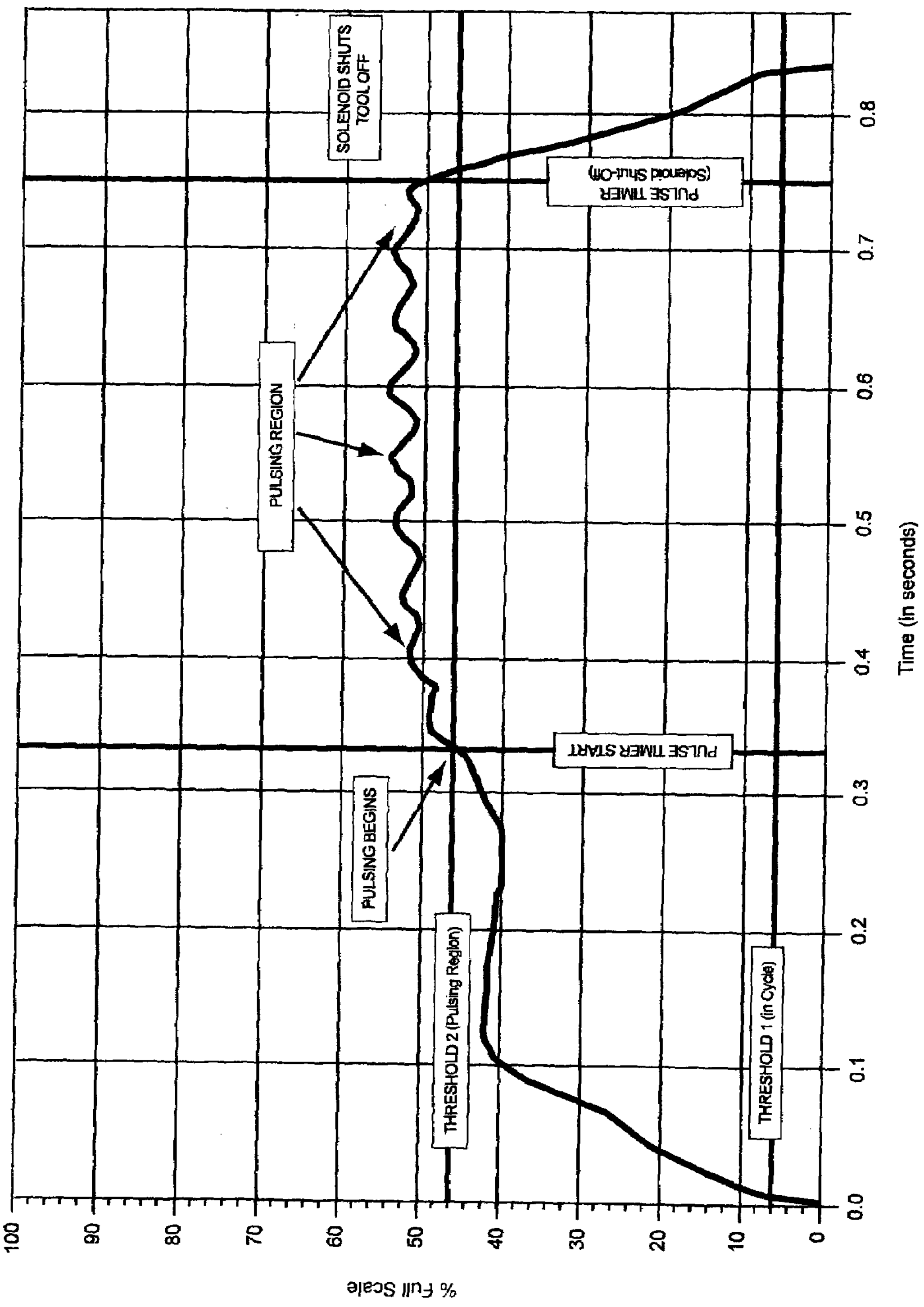
FIG. 1 shows the signature for a conventional pneumatic pulse tool monitored according to this invention.

FIG. 1 shows the signature of a conventional pneumatic pulse tool according to this invention. The signature is for a pulse tool with a solenoid controlled shut-off for the air supply. The system monitors a compressed air driven tool by a means for measuring air pressure inside the pulse tool. This air pressure is converted into an electrical signal and the pre-programmed microprocessor is configured to determine if the electrical signal has met the requirements set forth by the thresholds and timers.

The signature or graph shows two distinct regions. Threshold 1 is the in cycle region and threshold 2 is the pulsing region. TH1 is a threshold used by the control to know when the tool is in cycle. The threshold will be just above the noise floor. As soon as the signal rises above that threshold, the qualifier will begin monitoring and storing data.

When the signal enters the region TH2, it will consider the tool to be in the pulsing region. The timer start will be associated with this region. Pulse tools are ineffective if they are not allowed to pulse at least 3 or 4 times. MIN. Run Timer will set a minimum amount of time that the tool must remain in the pulsing region guaranteeing that the mechanical torque adjustment on the tool will be effective. The signal will have to remain in the pulsing region for the minimum amount of time to be considered effective. The solenoid shuts the tool off when the signal remains in the pulse region for the minimum amount of time.

FIG. 1 has a vertical axis measured in % Full Scale because the device monitors an analog signature representative of air pressure. The Scale represents pressure. In FIG. 1 the Scale represents 0–to 100 psi.

Figure 2:
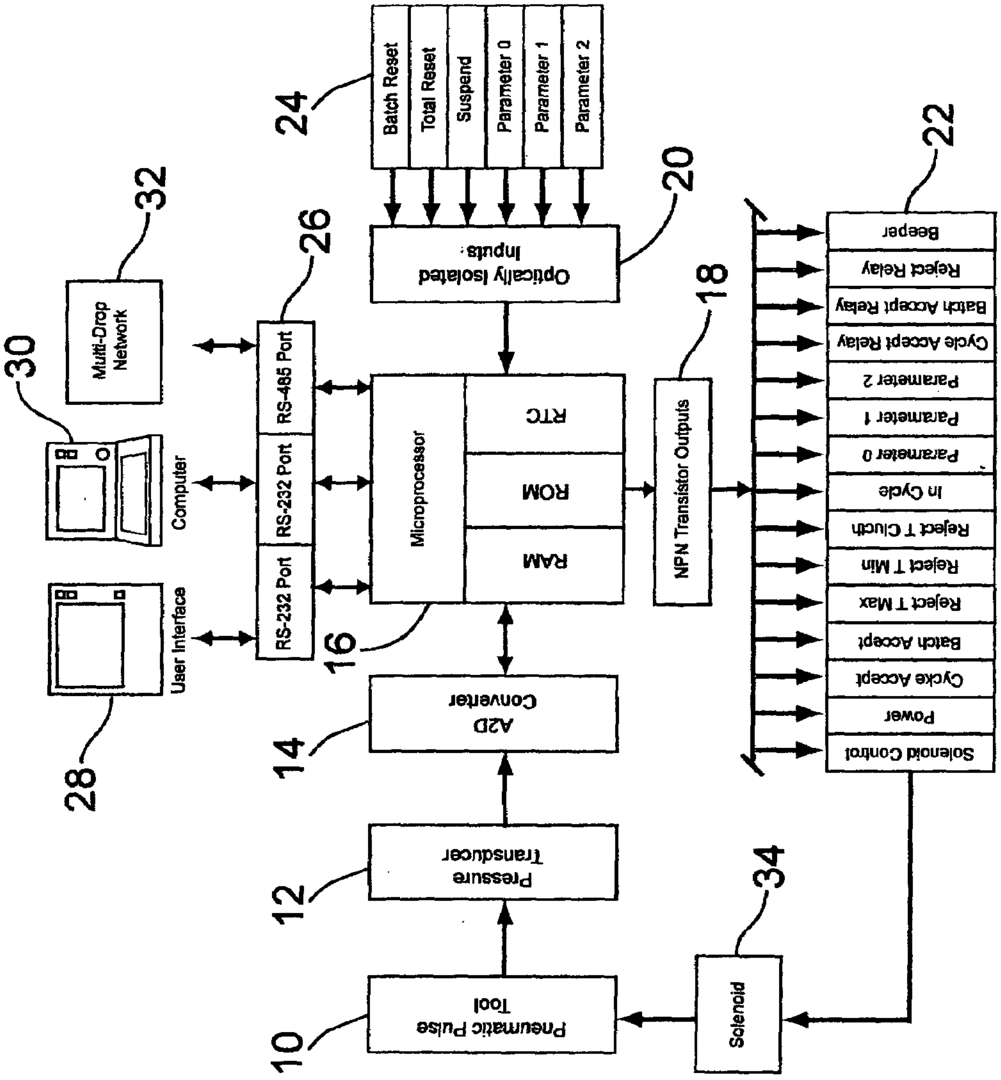
FIG. 2 is a diagram for monitoring a conventional pneumatic pulse tool according to this invention.

FIG. 2 is a diagram that illustrates a pulse tool qualifier according to this invention. FIG. 2 illustrates a pulse tool control/monitor with a solenoid shut off for the air supply. FIG. 2 shows pneumatic pulse tool 10 connected to pressure transducer 12. Transducer 12 measures air pressure to tool 10 and converts the pressure to electrical signals. A/D converter 14 receives the electrical signal from transducer 12 and coverts them in to binary code for use by microprocessor 16. NPN transistor outputs 18 and optically isolated inputs 20 represent the measured parameter of this invention. Output 18 maybe any of listed outputs 22 and input 20 may be any of listed outputs 24. Ports 26 connect the system to conventional hardware such as user interface 28, computer 30 and network 32. Solenoid 34 controls the regulated compressed air to tool 10.

Figure 3:
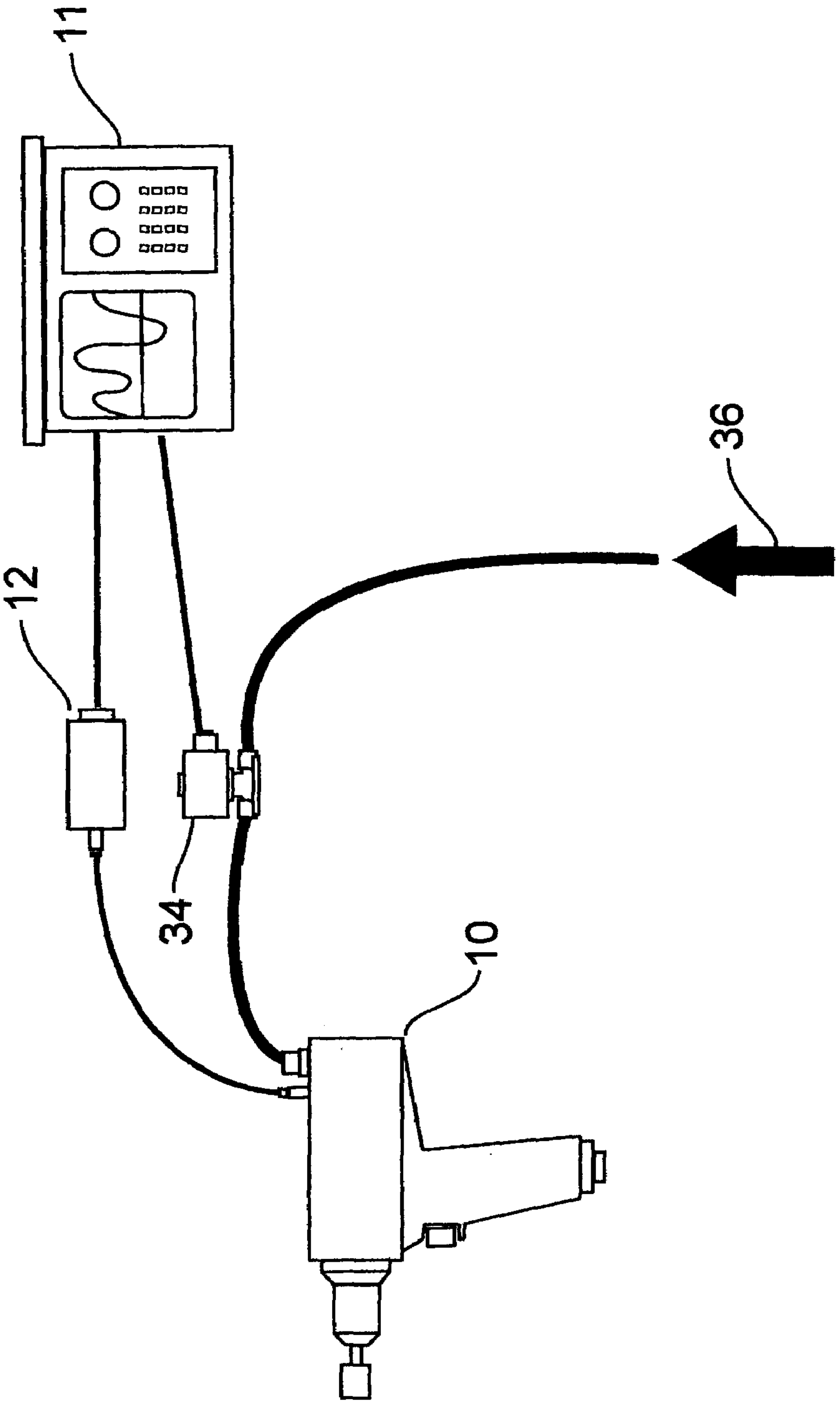
FIG. 3 is a schematic view of a pulse tool and control system according to this invention.

FIG. 3 shows a pulse tool and control system according to this invention. FIG. 3 shows a solenoid equipped pulse tool control system. FIG. 3 shows pneumatic pulse tool 10 and microprocessor 16. Pressure transducer 12 is connected between microprocessor 16 and tool 10. Also shown is regulated compressed air 36. Solenoid valve 34 is connected to microprocessor 16. Solenoid valve 34 also is connected between compressed air 36 and tool 10. The control is external to tool 10 and regulates compressed air supply 36 outside of tool 10.

The software is configured to know how to identify individual pulses. When the unit is in cycle and collecting data the software determines if the current data point being sampled is in the region (between the thresholds) where pulsing is expected to occur. If it is, a pulse width worth of samples leading up to the point are retrieved from memory. A variable represent the minimum peak to valley differential the software is willing to accept as a pulse. The software analyzes the data point that would be the center of the data that has been pulled from memory. The software also looks to see if there are data points that are the value less than the point that is being analyzed on both sides of the data point within the pulse width worth of data that is being analyzed. If there are, this point is considered to be a positive pulse. A count of all the positive pulses is kept during a rundown and this pulse count is compared to the desired number of pulses at the end of the run. At the end of the run, if all criteria are met including timers, thresholds, and number of pulses, then the fastening is considered good.

In a preferred embodiment the programmed microprocessor is configured to determine the duration that the measured air pressure remained above the first threshold but less than the second and considers this duration to be the free run time. The programmed microprocessor then is configured to store a minimum run timer. The programmed microprocessor also is configured to store a maximum run timer. The programmed microprocessor then is configured to generate a reject if the free run time is less than the value stored in the minimum run timer and configured to generate a reject if the free run time is greater than the value stored in the maximum run timer.

In the most preferred embodiment the programmed microprocessor is configured to determine the duration that the measured air pressure remains in the pulsing region above the second threshold.

In another embodiment, the programmed microprocessor is configured to store a timer that represents a minimum pulsing timer and the programmed microprocessor is configured turn off the mechanism controlling the air flow to the tool once the measured air pressure remains in the pulsing region for a timer greater than a minimum pulsing timer.

Next, the microprocessor is configured to report a reject if the minimum pulsing timer is not satisfied and configured to report an acceptable condition if all of the timers are satisfied and the air flow to the tool has been shut-off by the microprocessor.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A system for monitoring and controlling a compressed air driven, pulse tool comprising:

- a means for measuring air pressure within a pneumatic pulse tool and converting the air pressure into an electrical signal representative of the air pressure;
- a means for electrically computationally processing the electrical signal into another signal representative of at least one parameter corresponding to a condition of the tool being monitored which is a function of air pressure;
- a programmed microprocessor configured to identify a portion of the signal representative of the air pressure corresponding to the parameter;
- a means for controlling the flow of air to the tool wherein the means is external to the tool;
- wherein the programmed microprocessor is configured to identify and store the parameter of a first threshold air pressure to begin monitoring the parameter of a cycle;
- wherein the programmed microprocessor is configured to identify and store the parameter of a second air pressure to identify a portion of the signal representative of the pressure of the tool driving a fastener;
- wherein the microprocessor is configured to indicate a pulsing region based on the parameter of the second air pressure;
- wherein the programmed microprocessor is configured to identify and store a portion of the air pressure as a calibration value for the parameter of the second air pressure;
- wherein the programmed microprocessor is configured to identify and store timers to be associated with the parameters; and
- wherein the microprocessor is configured to report an acceptable condition if all of the timers are satisfied and the air flow to the tool has been shut-off by the microprocessor.

2. A system according to claim 1 wherein the programmed microprocessor is configured to determine the duration that the measured air pressure remained above the first threshold but less than the second and considers this duration to be the free run time.

3. A system according to claim 1 wherein the programmed microprocessor is configured to store a minimum run timer.

4. A system according to claim 1 wherein the programmed microprocessor is configured to store a maximum run timer.

5. A system according to claims 2 wherein the programmed microprocessor is configured to generate a reject if the free run time is less than the value stored in the minimum run timer.

6. A system according to claims 2 wherein the programmed microprocessor is configured to generate a reject if the free run time is greater than the value stored in the maximum run timer.

7. A system according to claim 1 wherein the programmed microprocessor is configured to determine the duration that the measured air pressure remains in the pulsing region above the second threshold.

8. A system according to claim 1 wherein the programmed microprocessor is configured to store a timer that represents a minimum pulsing timer.

9. A system according to claim 7 wherein the programmed microprocessor is configured to turn off the mechanism controlling the air flow to the tool once the measured air pressure remains in the pulsing region for a timer greater than a minimum pulsing timer.

10. A system according to claim 7 wherein the microprocessor is configured to report a reject if the minimum pulsing timer is not satisfied.

11. A system according to claim 1 wherein the means for controlling the flow of compressed air to the tool is a solenoid located between the supply of compressed air and the tool.

12. A system according to claim 11 wherein the microprocessor is connected to and controls the solenoid.

13. A system according to claim 11 wherein a pressure transducer is connected between the microprocessor and the tool.

* * * * *